United States Patent Office 3,017,501
Patented Jan. 16, 1962

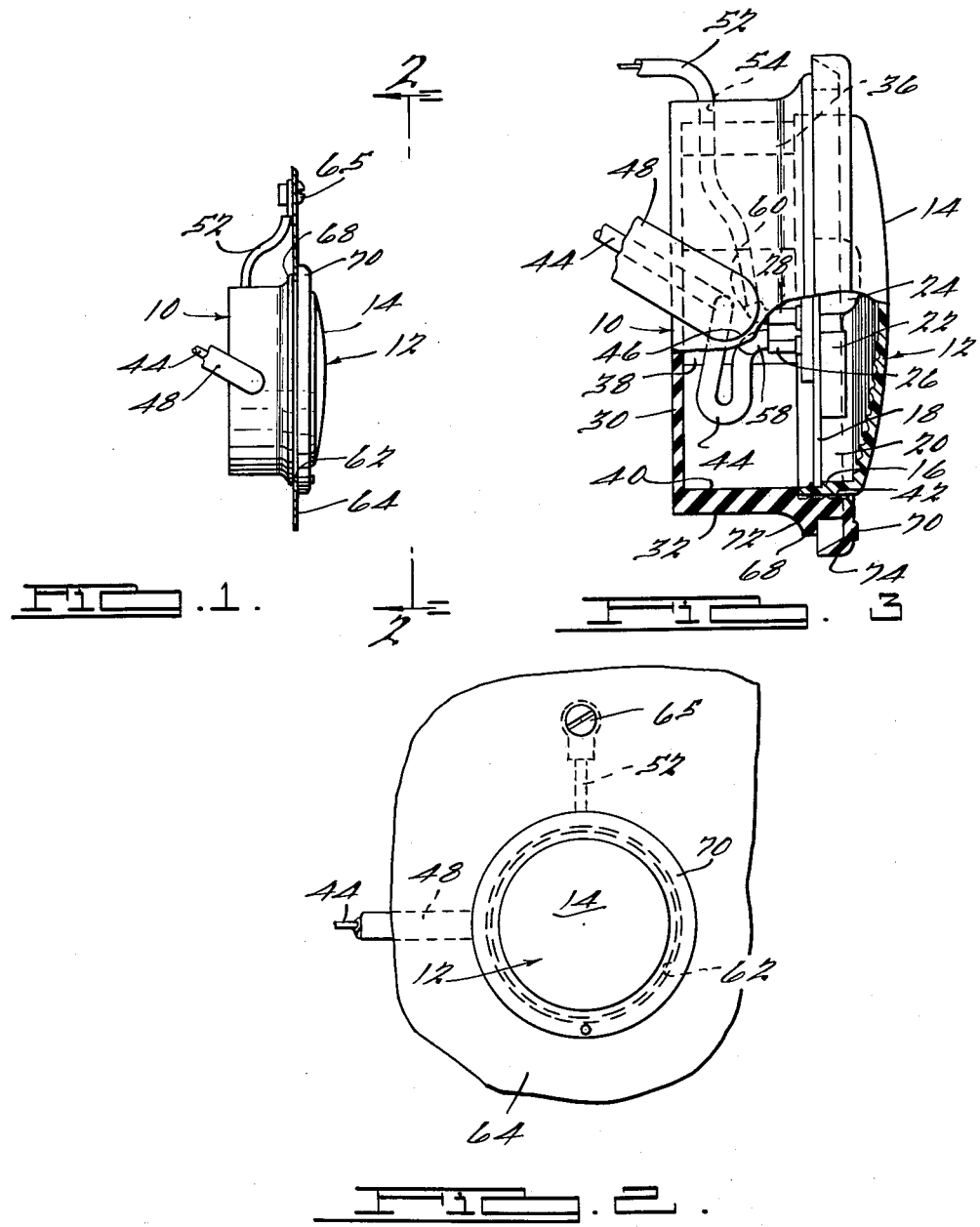

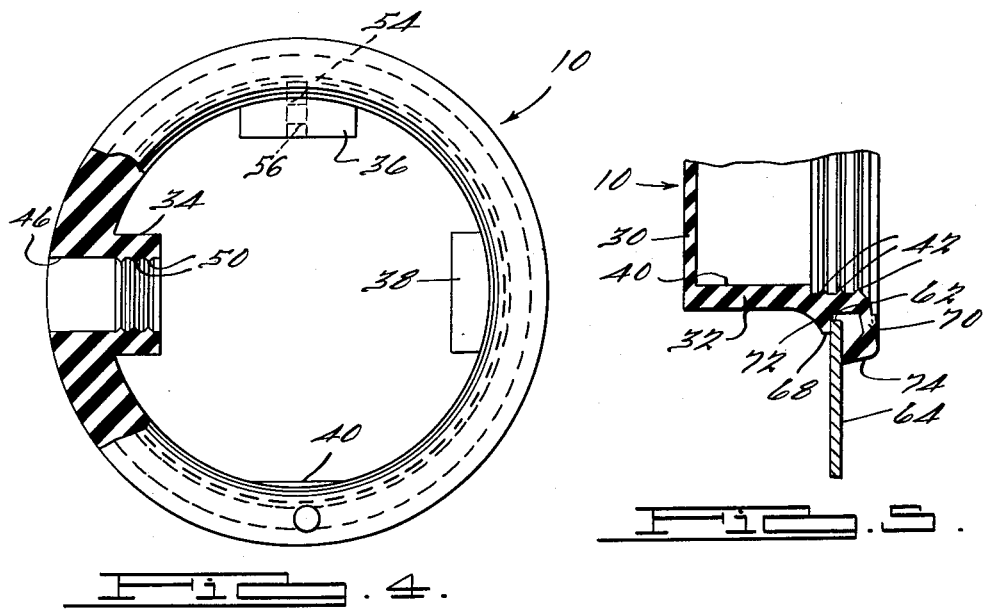
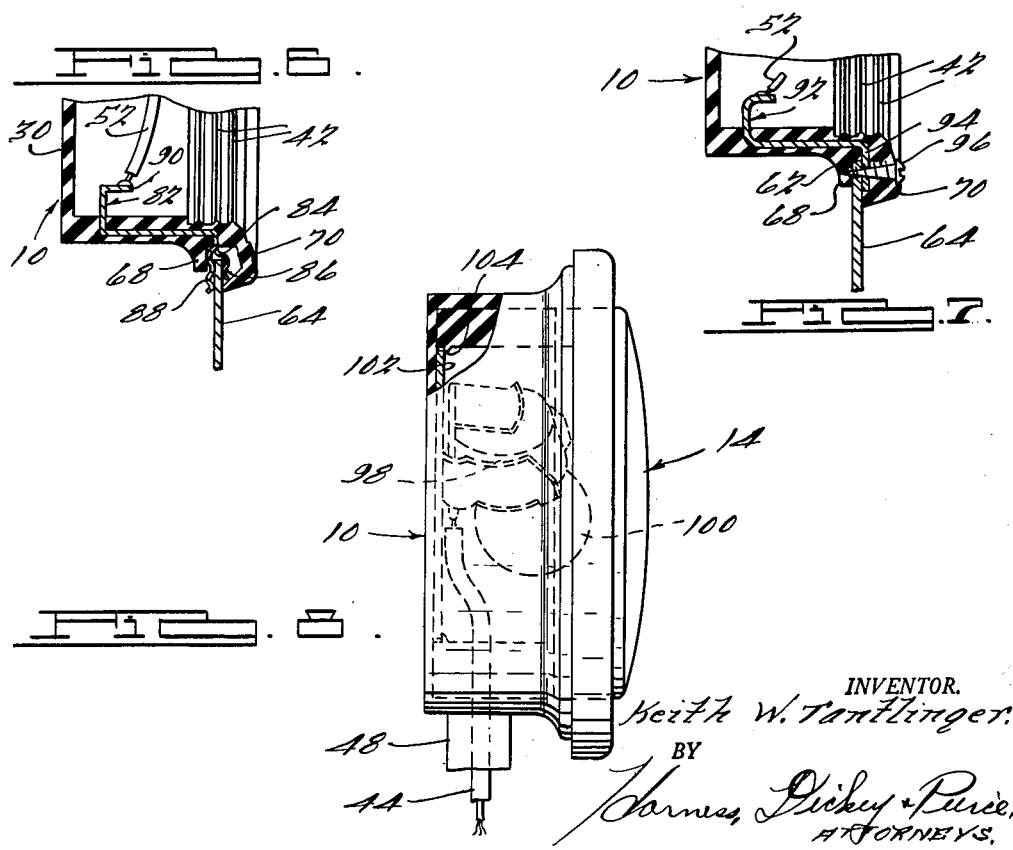

3,017,501
TRAILER CLEARANCE AND MARKER LIGHT
Keith W. Tantlinger, Grosse Pointe Shores, Mich., assignor to Fruehauf Trailer Company, Detroit, Mich., a corporation of Michigan
Filed July 10, 1959, Ser. No. 826,148
7 Claims. (Cl. 240—8.2)

This invention relates to new and useful improvements in trailer lights and to means for mounting the same on a trailer.

The trailer light of this invention is primarily intended to be used as an external light on the trailer although it can be used wherever a light is needed or desirable. Typical uses are trailer clearance lights, marker lights, identification lights and license illumination lights.

An important object of the present invention is to provide a trailer light assembly that is weathertight so that electrical connections at the lights are not affected by rain or road splash or by dirt, ice, snow or other conditions encountered in use.

Another object of the invention is to provide a trailer light assembly of the above mentioned character in which the lamp component is readily accessible and can be easily replaced without destroying or adversely affecting the weathertightness of the assembly.

Still another object of the invention is to provide a trailer light assembly of the above mentioned character having a housing capable of functioning both as a receptacle for the lamp and as a junction or terminal box whereby to eliminate at least some of the terminal boxes heretofore used in the wiring system of a trailer.

Other objects and advantages of the invention will be apparent during the course of the following description.

In the drawings forming a part of this specification and wherein like numerals are employed to designate like parts throughout the same;

FIGURE 1 is a side elevational view showing a trailer light assembly embodying the invention and illustrating a typical mounting therefor;

FIG. 2 is a front elevational view, looking in the direction of the arrows 2—2 in FIGURE 1;

FIG. 3 is an enlarged side view of the light assembly, per se, showing parts broken away for clearness of illustration;

FIG. 4 is a face plan view of the housing shown in in FIG. 3, parts thereof being broken away and shown in section for clearness of illustration;

FIG. 5 is a fragmentary sectional view of the housing and showing the same on a mounting plate;

FIG. 6 is a fragmentary sectional view of the housing and showing a clip for electrically grounding the light assembly mounted therein;

FIG. 7 is a view similar to FIG. 6 but showing a modified form of ground clip; and FIG. 8 is a side view showing parts in elevation and parts in section for clearness of illustration of a modified light assembly embodying the invention.

The light assembly shown in FIGS. 1–5 comprises a cup-shaped, one-piece, molded housing 10 of rubber or the like and a sealed lamp unit 12 fitting snugly in and closing the mouth of the housing.

The lamp unit 12 here shown is a conventional unit of the type shown in U.S. Patent No. 2,853,595. It comprises a circular lens 14 of suitably colored plastic or equivalent material having an annular flange or skirt 16.

A disk-shaped plate 18 in and snugly fitting the skirt 16 provides a sealed chamber 20 within the lens. Mounted on the plate 18 within the chamber 20 is a lamp socket 22 which carries a bulb 24, and female terminals 26 and 28 extending from the socket through the plate 18 provide electrical connections for the bulb according to conventional practice.

The housing 10 has a circular bottom portion 30 and an integral annular side wall portion 32 which surrounds and snugly fits the lamp unit 12 as hereinabove described. As shown in FIG. 3, the lamp unit 12 extends only part way into the housing 10 and the lens 14 projects slightly forwardly of the housing. The central portion of the lens 14 preferably is bulged slightly so as to be clearly visible from the side as well as the front of the housing.

In order to limit movement of the lamp unit 12 into the housing 10 and to position the lamp unit properly in the housing, the latter is formed with right angularly disposed diametrically opposed internal abutments 34, 36, 38 and 40 which seat the under or inner side of the lamp unit. The abutments 34, 36 and 38 are relatively wide to provide a good solid seat for the lamp unit 12 and the abutment 40 is essentially narrower radially of the housing than the abutments 34, 36 and 38. The abutment 40 normally supports the lamp unit 12 in the same manner as the abutments 34, 36 and 38 but is adapted to release the unit when the latter is pressed inwardly at a point directly over the abutment 40. Pressure exerted in this manner on one side of the lamp unit 12 causes it to snap past the narrow abutment 40 and to tilt into the housing 10. As the lamp unit 12 tilts, it rocks on the abutments 34 and 38 and the side thereof normally supported by the abutment 36 lifts out of the housing. The outwardly tilted portion of the lamp unit 12 can then be easily grasped to remove the latter from the housing 10.

As suggested, the lamp unit 12 fits the housing relatively snugly to provide a weathertight closure therefor. However, in order to enhance the weathertight fit between the unit 12 and the housing 10, the surrounding portion of the housing preferably is formed with a plurality of spaced annular and circumferentially continuous inwardly directed ribs 42. These ribs 42 press against the skirt portion 16 of the lens 14 and provide a particularly good seal which prevents moisture and dirt from entering the housing 10.

In order to connect the bulb 24 electrically into the wiring harness of the trailer, a lead-in wire 44 from the harness is brought into the housing 10 through an opening 46 in the side wall thereof. The lead-in wire 44 conventionally is encased by a plastic sheathing 48 which fits the hole 46 essentially tightly. In this connection it will be observed (FIG. 4) that the hole 46 is located at one of the relatively wide embossments and in this particular instance is shown extending through the embossment 34. By bringing the lead-in wire into the housing 10 at this point an essentially longer hole is provided than would be the case if it were located in the relatively thin intermediate side wall of the housing and the relatively long bearing surface provided by the hole assists in maintaining an effective weathertight joint between the sheathing 48 and the housing. If desired, the hole 46 can be provided with a plurality of spaced annular circumferentially continuous ribs 50 which press against the surface of the sheathing and preferably, at least partially embed themselves into the sheathing to assure weathertightness. The wire 44 is connected to the "hot" terminal 26 of the socket 22.

A ground wire 52 also introduced through the side wall of the housing 10 is electrically connected to the other terminal 28. A hole 54 in the side wall of the housing 10 accommodates the ground wire 52 and it preferably fits the insulation of the wire relatively tightly to assure weathertightness. The hole 54 also is located in one of the embossments to provide an essentially long bearing surface for the conductor 52 and is here shown in the embossment 36. Exteriorly of the housing 10 the wire 52 is electrically connected to any suitable ground such as a structural metallic part of the trailer body as shown in FIGURE 1, for example. If desired, the hole 54 may be formed with a plurality of spaced annular circumferentially continuous ribs 56 to assure a weathertight fit with the conductor 52.

The two conductors 44 and 52 preferably have conventional male terminals 58 and 60, respectively (FIG. 3), that snap into the female terminals 26 and 28. Sufficient lengths of the conductors 44 and 52 are provided inside the housing 10 so that the male terminals 58 and 60 can be attached to and disengaged from the female terminals 26 and 28 when the lamp unit 12 is removed or partially removed from the housing 10. Thus, if the bulb 24 burns out, for example, the lamp unit 12 can be removed from the housing 10 and the male terminals 58 and 60 disengaged therefrom and a replacement unit 12 then connected to the conductors 44 and 52 and assembled with the housing 10.

The housing 10 is adapted to be mounted in the opening 62 of a mounting part or plate 64 that may comprise any suitable or convenient part of the trailer and the ground wire 52 is shown connected to the plate 64 by a screw 65. Clearance and marker lights, for example, are positioned at different locations on the trailer and they are of course attached to and carried by different structural parts thereof. In the case of a van-type trailer, the side clearance lights may be mounted in the side wall skin panels or they may be associated with one of the vertical supporting or corner posts or with the floor or cap rails. The rear marker lights conventionally are carried by a mounting bracket which extends transversely of and depends from the under structure of the trailer body.

In order to mount the light assembly in the part 64 the housing 10 is formed preferably at the front thereof with spaced external circumferential flanges 68 and 70. The housing 10 fits the hole 62 relatively loosely but the flanges 68 and 70 are larger in diameter than the hole. However, the rear flange 68 is only slightly larger than the hole 62 so that when the housing is pushed into the hole the flange 68 snaps through and locks the housing in place. To this end the back or under side of the flange 68 is tapered or bevelled as at 72 to facilitate passage of the flange through the hole 62. The front flange 70 is considerably larger in diameter than the hole 62 and is formed with a tapered rearwardly extending lip 74 the edge of which normally is disposed in substantially the same radial plane as the front face of the flange 68 (FIG. 3). When the housing 10 is inserted in the hole 62 in the manner hereinabove described, the lip 74 is pressed against the mounting part 64 and flexes outwardly as shown in FIG. 5. Pressure thus exerted by the lip 74 against the mounting part 64 holds the rear flange 68 pressed forwardly against the part 64 and the housing 10 securely mounted. Manifestly, the lip 74 can flex varying amounts to compensate for different thicknesses of the mounting member so that a standard housing construction will adapt to different mounting locations on the trailer. When thus mounted, the light assembly provides a completely sealed unit and the mounting part 64 need not be closed behind the assembly as heretofore required in conventional installations.

It sometimes is necessary to mount several light assemblies side by side. When this condition obtains, all of the light assemblies may be electrically connected to the wiring harness of the trailer, and the electrical connections between the light assemblies or between the light assemblies and the harness are contained within the sealed housings 10. As a consequence, it is possible to eliminate the junction or terminal boxes heretofore required in making necessary electrical connections between closely grouped lights.

In some instances it may be desirable to provide a ground connection directly on the housing 10 and to ground the latter to the mounting part 64 instead of running the ground wire 52 out through the side of the housing as shown in FIG. 3. FIG. 6 illustrates such a connection in the form of a metallic ground strip 82 extending radially through the side wall of the housing 10 between the flanges 68 and 70. The ground strip 82 is closely received by a slit formed in the housing wall and the resilient nature of the material from which the housing is made causes it to grip the strip 82 essentially tightly to assure weatherproofness at this point. Exteriorly of the housing, the ground strip 82 is formed with an essentially wide head portion 84 which has alternately disposed spaced resilient fingers 86 and 88 arranged to slip over and clampingly engage the mounting member 64 when the housing is snapped into place in the hole 62. The pressed engagement of the fingers 86 and 88 with the metallic mounting member 64 provides a good electrical connection therebetween. Within the housing 10 the ground strip 82 is formed with a terminal leg portion 90 which is adapted to be suitably electrically connected within the housing to the ground wire 52.

Alternatively, a ground strip 92 of the form shown in FIG. 7 can be used. The ground strip 92 there shown extends radially through the side wall of the housing between the external mounting flanges 68 and 70 in the same manner as the ground strip 82. However, the ground strip 92 is formed exteriorly of the housing with an enlarged flat terminal portion 94 which extends parallel to the underside of the front flange 70. When the housing 10 is installed in the mounting member 64, the terminal 94 overlays and flatly engages the member 64 adjacent to the mounting hole 62. After installation, a hole is drilled through the terminal 94 and the mounting member 64 and adjacent parts of the housing 10, and a sheet metal screw 96 is inserted therethrough to hold the terminal 94 pressed tightly in metal-to-metal contact with the member 64 to assure a good electrical connection therebetween. Within the housing 10, the ground strip 92 may be formed in the same manner as the ground strip 82 and similarly connected to the ground wire 52.

It is not essential that the light bulb and its socket be mounted as part of a sealed assembly within the lens 14 although this construction is desirable and has certain advantages over a separately mounted lamp and socket arrangement. It is contemplated, for example, that the lamp bulb and socket can be separate from the lens 14 and mounted farther back in the housing 10, as shown in FIG. 8. In this construction a conventional socket 98 carrying a bulb 100 is shown attached to a mounting plate 102 disposed within and on the bottom of the housing 10. The mounting plate 102 preferably fits relatively snugly within the confines of the housing and is held in position against the bottom of the housing in any suitable manner as by overlying tabs 104 formed on the side wall or the abutments of the housing. When retained in this manner, the mounting plate 102 normally is held securely in place by the tabs 104, but it can be easily disengaged therefrom and removed from the housing when desired. The lead-in wire 44 is electrically connected to the socket 98 in the conventional manner, and a ground connection (not shown) which may assume any of the forms hereinabove described also is provided. The lens 14 is a separate individual part of the assembly and is retained within the housing 10 in the same manner as the lamp unit 12 described in connection with the first form of the invention. As shown, the lens 14 normally closes and seals the mouth of the housing 10 but it can be removed in the same manner as the lamp unit 12 to provide access to the interior of the housing.

What is claimed is:

1. A trailer light comprising a cup-shaped one-piece molded rubber housing adapted to fit snugly in a mounting hole and having spaced external flanges for holding said housing in said hole, and a lens fitting snugly in and closing the mouth of said housing, said housing having formed internal abutments provided with radial shoulders seating said lens and limiting movement thereof into said housing, at least one of said abutments being essentially narrower radially of the housing than the other of said abutments and normally supporting said lens but adapted to release the same when said lens is pressed inwardly at a point adjacent thereto, whereby the pressed side of said lens can be snapped past said relatively narrow abutment and tilted into the housing to facilitate removal thereof from said housing.

2. A trailer light comprising a cup-shaped one-piece molded rubber housing adapted to fit snugly in a mounting hole and having spaced external flanges for holding said housing in said hole, a lens fitting snugly in and closing the mouth of said housing, said housing having formed internal abutments provided with radial shoulders seating said lens and limiting movement thereof into said housing, at least one of said abutments being essentially narrower radially of the housing than the other of said abutments and normally supporting said lens but adapted to release the same when it is pressed inwardly at a point adjacent thereto, whereby the pressed side of said lens can be snapped past said relatively narrow abutment and tilted into the housing to facilitate removal thereof from said housing, light means in said housing behind said lens, and electrical conductors extending through and press fitted in holes in the wall of said housing and at least one of said abutments connected to said light means, the location of the holes at said abutments providing relatively long bearing surfaces for said conductors and assuring a weathertight joint between said conductors and said housing.

3. A trailer light comprising a cup-shaped one-piece molded rubber housing adapted to fit snugly in a mounting hole and having spaced external flanges for holding said housing in said hole, and a lens fitting snugly in and closing the mouth of said housing, said housing having continuous internal annular ribs surrounding and engaging the periphery of said lens to provide a weathertight joint between the lens and said housing, the housing also having formed internal abutments providing radial shoulders seating said lens and limiting movement thereof into said housing, at least one of said abutments being essentially narrower radially of the housing than the other of said abutments and normally supporting said lens but adapted to release the lens when said lens is pressed inwardly at a point adjacent the relatively narrow abutment whereby the pressed side of said lens can be snapped past said relatively narrow abutment and tilted into the housing to facilitate removal thereof from said housing.

4. A trailer light comprising a cup-shaped one-piece molded rubber housing adapted to fit snugly in a mounting hole and having spaced external flanges for holding said housing in said hole, a lens fitting snugly in and closing the mouth of said housing, said housing having continuous internal annular ribs surrounding and engaging the periphery of said lens to provide a weathertight joint between the lens and said housing, the latter also having formed internal abutments provided with radial shoulders seating said lens and limiting movement thereof into said housing, at least one of said abutments being essentially narrower radially of the housing than the other of said abutments and normally supporting said lens but adapted to release the same when pressed inwardly at a point adjacent thereto, whereby the pressed side of said lens can be snapped past said relatively narrow abutment and tilted into the housing to facilitate removal thereof from said housing, light means in said housing behind said lens, and electrical conductors extending through and press fitted in holes in the wall of said housing and at least one of said abutments connected to said light means, the location of the holes at said abutments providing relatively long bearing surfaces for said conductors and assuring a weathertight joint between said conductors and said housing, the bearing surfaces of said holes having continuous internal annular ribs surrounding and tightly engaging the said conductors to enhance the weatherproofness of said joint.

5. A trailer light comprising a cup-shaped one-piece molded rubber housing adapted to fit snugly in a mounting hole and having spaced external flanges for holding said unit in said hole, and a sealed light unit fitting snugly in and closing the mouth of said housing, said housing having formed internal abutments behind said light unit providing radial shoulders seating the bottom of said light unit and limiting movement thereof into said housing, at least one of said abutments being essentially narrower radially of the housing than the other of said abutments and normally supporting the light unit but adapted to release said unit when the latter is pressed inwardly at a point adjacent thereto, whereby the pressed side of said light unit can be snapped past said relatively narrow abutment and tilted into the housing to facilitate removal thereof from said housing, and electrical conductors extending through and press fitted in holes in the side wall of said housing and said abutments detachably connected within the housing to said light unit, the location of said holes at said abutments providing relatively long bearing surfaces for said conductors to assure a weathertight joint between said conductors and said housing.

6. A trailer light comprising a cup-shaped one-piece molded rubber housing adapted to fit snugly in a hole provided in a mounting member and having external flanges for holding said housing in said hole, light means in said housing, a lens fitting snugly in and closing the mouth of said housing, said housing having formed internal abutments on the side wall thereof behind said lens providing radial shoulders seating the under or inner side of the lens and normally limiting movement thereof into said housing, at least one of said abutments being essentially narrower radially of the housing than the other of said abutments and normally supporting said lens but adapted to release the latter when it is pressed inwardly at a point adjacent thereto, whereby the pressed side of said light unit can be snapped past said relatively narrow abutment and tilted into the housing to facilitate removal thereof from the housing, a ground clip extending through a radial slit in the side wall of said housing having spaced resilient fingers externally of the housing and between said external flanges for embracing and electrically connecting with said mounting member and a connecting portion within said housing, an electrical ground connection between said light means and the connecting portion of said clip, and an electrical conductor extending through and press fitted in a hole in the side wall of said housing and one of said abutments connected inside the housing to said light means, the location of said hole at said abutment providing a relatively long bearing surface for said conductor to assure a weathertight joint between the conductor and the housing.

7. A trailer light comprising a cup-shaped one-piece molded rubber housing adapted to fit snugly in a mounting hole and having means for holding said housing in said hole, and a lens fitting snugly in and closing the mouth of said housing, said housing having a plurality of discrete, circumferentially spaced, internal abutments provided with radial shoulders seating said lens and limiting movement of the latter into said housing, said abutments and the lens supporting shoulders thereof being circumferentially spaced around the periphery of the lens so as to hold the same properly in the housing, and two of said abutments adjacent to each other being circumferentially spaced relatively farther apart than other circumferentially adjacent abutments and a sufficient distance to permit rocking of said lens on said relatively widely circumferentially spaced abutments and tilting thereof into said housing when the lens is pressed inwardly at a point intermediate said relatively widely spaced abutments, whereby to facilitate removal of the lens from said housing.

References Cited in the file of this patent

UNITED STATES PATENTS

| | | |
|---|---|---|
| 2,049,224 | Ribble et al. | July 28, 1936 |
| 2,096,270 | Worden | Oct. 19, 1937 |
| 2,208,155 | Daehler | July 16, 1940 |
| 2,807,710 | Williams | Sept. 24, 1957 |
| 2,850,312 | Rifkin | Sept. 2, 1958 |
| 2,853,595 | Baldwin | Sept. 23, 1958 |
| 2,859,492 | Nicoll | Nov. 11, 1958 |
| 2,860,233 | Johnson | Nov. 11, 1958 |